(12) United States Patent
Pille-Wolf et al.

(10) Patent No.: US 11,634,562 B2
(45) Date of Patent: Apr. 25, 2023

(54) TIRE COMPOSITION AND METHOD FOR MAKING THEREOF

(71) Applicant: Kraton Polymers LLC, Houston, TX (US)

(72) Inventors: Wolfgang Pille-Wolf, Almere (NL); Jochem H. W. Vervelde, Almere (NL); Jeremie Pichereau, Almere (NL); Mark C Schaapman, Almere (NL)

(73) Assignee: KRATON CORPORATION, Houston, TX (US)

( * ) Notice: Subject to any disclaimer, the term of this patent is extended or adjusted under 35 U.S.C. 154(b) by 290 days.

(21) Appl. No.: 16/947,520

(22) Filed: Aug. 5, 2020

(65) Prior Publication Data

US 2021/0087369 A1   Mar. 25, 2021

Related U.S. Application Data

(60) Provisional application No. 62/903,389, filed on Sep. 20, 2019.

(51) Int. Cl.
*C08L 9/06* (2006.01)
*B60C 1/00* (2006.01)
*B60C 11/00* (2006.01)

(52) U.S. Cl.
CPC ............. *C08L 9/06* (2013.01); *B60C 1/0016* (2013.01); *B60C 11/0008* (2013.01); *B60C 2011/0025* (2013.01); *C08L 2205/025* (2013.01); *C08L 2205/035* (2013.01)

(58) Field of Classification Search
CPC ................ C08L 9/06; C08L 2205/025; C08L 2205/035; B60C 1/0016; B60C 11/0008; B60C 2011/0025
See application file for complete search history.

(56) References Cited

U.S. PATENT DOCUMENTS

| | | | |
|---|---|---|---|
| 2016/0237313 A1* | 8/2016 | Williams | B01D 15/00 |
| 2016/0251503 A1* | 9/2016 | Chenchy | C08K 5/548 524/271 |
| 2017/0190935 A1* | 7/2017 | Schaapman | C08G 63/48 |
| 2018/0105681 A1* | 4/2018 | Pille-Wolf | C08G 67/00 |
| 2018/0105693 A1* | 4/2018 | Lange | C08L 93/04 |
| 2019/0002733 A1 | 1/2019 | Schaapman | |

FOREIGN PATENT DOCUMENTS

| | | |
|---|---|---|
| EP | 2749403 A1 | 7/2014 |
| EP | 3511179 B1 | 11/2020 |
| WO | 2015048402 A1 | 4/2015 |

* cited by examiner

Primary Examiner — Doris L Lee

(57) ABSTRACT

The disclosure relates to tire tread compositions and methods for making. The compositions include a rubber, a rosin ester resin and at least one filler. The rosin ester resin is characterized as having a PAN number of less than 25, an acid number less than 20, a hydroxyl number of less than 30, a combined acid number and hydroxyl value of less than 50. The tire tread composition has a wet grip resistance to rolling resistance indicator ratio ((tan δ at 0° C.)/tan δ at 60° C.) higher than a tire tread composition containing a comparable amount of a rosin ester having a combined acid number and hydroxyl value of more than 50.

19 Claims, No Drawings

TIRE COMPOSITION AND METHOD FOR MAKING THEREOF

RELATED APPLICATIONS

This application claims priority from U.S. Provisional Application No. 62/903,389, filed Sep. 20, 2019, the entire disclosure of which is incorporated herein by reference.

FIELD

The present disclosure relates to rubber compositions comprising rosin esters for use in tire applications.

BACKGROUND

Treads of high performance tires are expected to be safe and have outstanding traction and handling properties, wet grip, rolling resistance, and good wear characteristics. These properties can depend on the dynamic viscoelastic properties of the rubber compositions used in making the tires.

Rubber tires, such as those used in transportation, desirably have a rubber tread possessing attributes such as superior wet grip (wet traction) and rolling resistance, e.g., the force resisting the motion when a tire rolls on a surface. While dry grip is usually maintained by many rubber compositions, satisfactory wet grip is often not achieved. Rubber compositions having good wet grip improve wet skid resistance, but suffer from an increase in rolling resistance, the latter contributing to decreased fuel economy.

The two attributes, lower rolling resistance and higher wet grip performance, are influenced by properties that generally conflict with each other. In optimizing a tread for rolling resistance, the wet grip is often compromised. When optimizing for wet grip, the rolling resistance is often negatively affected.

To improve wet grip performance, the use of resin in tire compositions is well known in the art. Therefore, there is a still a need for a rubber composition that has a combination of both improved wet grip and good rolling resistance.

SUMMARY

In one aspect, a tire tread composition is disclosed. The composition comprises a rubber component, and based on 100 parts by weight (phr) of the rubber component, from 5 to 75 phr of a rosin ester resin having a PAN number of less than 25, an acid number from 0 to 20, a hydroxyl number of 0 to 30, a combined acid number and hydroxyl value of less than 50, from 50 to 200 phr of a filler, and from 0 to 75 phr of an plasticizer.

In another aspect, a method for preparing a tire rubber composition is disclosed. The method comprises: (a) providing 0-100 parts by weight (phr) of a rubber component, (b) providing 5 to 75 phr of a rosin ester resin having a PAN number of less than 25, an acid number from 0 to 20, a hydroxyl number of 0 to 30, a combined acid number and hydroxyl value of less than 50; 50 to 200 phr of a filler, and optionally up to 75 phr of a plasticizer; (c) mixing the rubber component, the rosin ester resin, the filler, and the optional plasticizer to form a mixture; (d) kneading the mixture; and (e) incorporating a cross-linking system into the kneaded mixture to form the tire rubber composition.

DESCRIPTION

The following terms will have the following meanings unless otherwise indicated.

phr means parts per hundred parts of elastomer (rubber). Elastomer and rubber are used interchangeably.

Polymer and interpolymer are used interchangeably and is meant to include higher oligomers having a number average molecular weight (Mn) equal to or greater than 100, including copolymers, terpolymers, tetrapolymers, etc.

$M_w$ (weight average molecular weight) and $M_n$ (number average molecular weight) are determined using GPC-SEC (gel permeation-size exclusion chromatography) in accordance with ASTM D5296 (2005). Polydispersity (PDI) is given by $M_w/M_n$.

Tg (glass-liquid transition or glass transition) can be determined according to ASTM D 6604 (2013).

Tsp (softening point) is determined by ASTM E28, ASTM 218, ring and ball, or ring and cup softening point tests.

Hydroxyl number is determined per ASTM E222.

Acid number is determined using ASTM D 5974-14.

PAN number refers to the sum of the weight percentages of palustric, abietic and neoabietic acid moieties in the rosin esters, as determined according to ASTM D5974-00 (2010).

Viscoelastic polymeric materials can be characterized by measuring their complex modulus, G*. The magnitude of the complex modulus, |G*|, is defined as $[(G')^2+(G'')^2]^{1/2}$, where G' is the storage modulus and G" is the loss modulus. G', and G", as well as phase angle (C), and damping can be measured using dynamic mechanical analysis (DMA) at temperatures between −100° C. and +100° C. as a function of strain amplitude, in accordance with ASTM D7605. The properties give an indication of features such as durability, traction, and handling. The magnitudes of the storage modulus (G') at −20° C. and −30° C. can be used as indicators for ice grip. Tan delta (tan δ is given by G'/G". The tan δ value at 0° C. is commonly used as an indicator for wet grip, and the tan δ value at 60° C. is commonly used as an indicator for rolling resistance. The magnitude of tan δ at −20° C. can be used as an indicator for snow grip.

Tan δ can be obtained using a dynamic viscoelastic tester. Good wet traction is predicted by a high value for G" (loss modulus) and tan delta at 0° C. Low rolling resistance is indicated by low tan δ values at 50° C. and higher temperatures. Tan δ at 100° C. can be used as an indicator of tire grip and other enhanced performance characteristics under extreme use conditions. Tan δ is determined by DMA in temperature-sweep/mode in double shear mode from −60° C. to +100° C. with a heat rate of 1° C./min at 10 Hz and a dynamic strain of 0.1% (from −60° C. to −5° C.) and a dynamic strain of 3% (from −5° C. to 100° C.) using a Metravib+450N.

Tensile strength, elongation, and modulus can be measured per ASTM D412.

Hardness refers to Hardness Shore A, according to DIN 53506.

Mooney viscosity MS or ML (1+4) at 100° C. can be measured according to DIN 53523.

Disclosed herein is a rubber composition comprising a rubber component, a rosin ester resin having a PAN number of less than 25, an acid number from 0 to 20, a hydroxyl number of 0 to 30, a combined acid number and hydroxyl value of less than 50, fillers, and an optional plasticizer.

Rubber Component: The rubber or elastomer component includes both natural rubber and its various raw and reclaimed forms, as well as various synthetic rubbers. In embodiments, the rubber component comprises any of unsaturated diene elastomer selected from polybutadienes, natural rubber, synthetic polyisoprenes, butadiene copolymers, isoprene copolymers and mixtures thereof.

In embodiments, the rubber is selected from butyl rubber, halogenated butyl rubber, and EPDM (Ethylene Propylene Diene Monomer rubber), and mixtures thereof. In another embodiment, the rubber component is selected from natural rubber (NR), styrene-butadiene rubber (SBR), butadiene rubber, synthetic polyisoprene rubber, epoxylated natural rubber, polybutadiene rubber, e.g., high-cis polybutadiene rubber; nitrile-hydrogenated butadiene rubber HNBR, hydrogenated SBR, ethylene propylene diene monomer rubber, ethylene propylene rubber, maleic acid-modified ethylene propylene rubber, butyl rubber, isobutylene-aromatic vinyl or diene monomer copolymers, brominated-NR, chlorinated-NR, brominated isobutylene p-methylstyrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, polyamide elastomers, and combinations thereof.

Examples of SBR rubber include an emulsion-polymerized styrene-butadiene rubber (un-modified E-SBR), a solution-polymerized styrene-butadiene rubber (un-modified S-SBR) and modified SBRs obtained by modifying terminals (modified E-SBR and S-SBR). The rubber component can comprise components other than SBR and BR such as natural rubber (NR), isoprene rubber (IR), epoxidized natural rubber (ENR), butyl rubber, acrylonitrile butadiene rubber (NBR), ethylene propylene diene rubber (EPDM), chloroprene rubber (CR) styrene-isoprene-butadiene rubber (SIBR), used alone or in combinations.

The rubber component may be coupled, star-branched, branched, and/or functionalized with a coupling and/or star-branching or functionalization agent. In embodiments, the rubber is coupled, star-branched, or functionalized with at least a sulfur compound, a silanol group, a silane group, or an epoxy group. In embodiments, the branched rubber can be any of branched ("star-branched") butyl rubber, halogenated star-branched butyl rubber, poly(isobutylene-co-p-methylstyrene), brominated butyl rubber, chlorinated butyl rubber, star-branched polyisobutylene rubber, and mixtures thereof.

In embodiments, the rubber is end-group functionalized to improve its affinity for fillers, such as carbon black and/or silica. Examples of coupling and/or star-branching or functionalizations include coupling with carbon black as a filler, e.g., with functional groups comprising a C—Sn bond or of aminated functional groups, such as benzophenone; silanol functional groups or polysiloxane functional groups having a silanol end; alkoxysilane groups, polyether groups.

Rosin Ester Resin Component: A reference to rosin ester includes modified rosin esters, e.g., rosin treated with an aldehyde, a dibasic acid, or combinations thereof, acid-modified rosin ester, phenolic-modified rosin ester. Rosin esters can be obtained from rosin and suitable alcohols in an esterification reaction using a variety of methods known in the art.

In embodiments, the rosin ester resin is a phenolic modified rosin ester, prepared by the reaction of rosin with a formaldehyde-containing compound and a phenolic compound, to yield an intermediate phenolic resin, which is then esterified with a polyhydric alcohol.

In embodiments, the rosin ester resin is made by a process known in the art, e.g. hydrogenation, dehydrogenation, disproportionation, dimerization, and fortification. In certain embodiments, rosin is processed using one or more of these methods prior to esterification to improve the chemical and physical properties of the resultant rosin esters. Where chemically permissible, such methods can also be performed in combination with esterification and/or following esterification to obtain a rosin ester having the desired chemical and physical properties, as discussed in more detail below. In one embodiment, the rosin ester resin is made in a method using disproportioning agents known in the art, including thiobis-naphthols, including 2,2'thiobisphenols, 3,3'-thiobisphenols, 4,4'-thiobis(resorcinol) and t,t'-thiobis(pyrogallol), 4,4'-thiobis(6-t-butyl-m-cresol) and 4/4'-thiobis(6-t-butyl-o-cresol) thiobisnaphthols, 2,2'-thio-bisphenols, 3,3'-thio-bis phenols; metals, including palladium, nickel, and platinum; iodine or iodides (e.g., iron iodide); sulfides (e.g., iron sulfide); and combinations thereof.

In embodiments, the rosin ester resin has a Mn ranging from 600 to 1400 Da (Daltons), or 650 to 1200 Da, or 700 to 1100 Da. In embodiments, the rosin ester resin has a Mw ranging from 700 to 1500 Da, or 800 to 1300 Da, or 850 to 1200 Da. In embodiments, the Mz ranges between 800 and 2000 Da, or 900 and 2000 DA, or 1000 and 1500 Da. In embodiments, the rosin ester resin has a polydispersity index (PDI) of from 1.05 to 1.45, alternatively from 1.1 to 1.4, or from 1.1 to 1.3.

In other embodiments, the rosin ester resin has a low PAN number of equal to or less than 25, or less than 20, or less than 15, or less than 10.

In embodiments, the rosin ester resin has a hydroxyl number (OH) of 0-30, or 0-20, or 0-15, or 0-10 or <10. In embodiments, the rosin ester has an acid number of 0-20, or 0-15, or 0-10, or 0-9, or 0-8, or between 0-7, or <7. In embodiments, the sum of the hydroxyl number and acid number of the rosin ester resins can be <50, or <45, or <40, or <35, <30, or <25, or <20, or <15, or <10, or in the range of 1-8.

In embodiments, the rosin ester resin has a Tsp of above 60° C., or above 80° C., or 60° C. to 170° C., or 75° C. to 160° C. or 100° C. to 150° C.

In embodiments, the rosin ester resin has a Tg from 0° C. to 115° C., or from 5° C. to 100° C., or from 10° C. to 80° C. or from 20° C. to 70° C., or from 30° C. to 60° C.

In embodiments, the rosin ester resin has properties in combination of the above. For example, a PAN of less than 20, or less than 15, or less than 10 in combination with one or more of the following: a Tsp of at least 60° C., above 80° C., or 60° C. to 170° C., or 75° C. to 160° C. or 100° C. to 150° C.; an acid number of 0 to 20, or 0-15, or 0-10, or 0-9, or 0-8, or between 0-7, or <7; or a combined acid number and hydroxyl value of less than 50, or <45, or <40, or <35, <30, or <25, or <20, or <15, or <10, or in the range of 1-8.

In embodiments, the rosin ester resin has a melt viscosity at 150° C. (also referred to as melt viscosity (150° C.)) of 12000 to 15000 mPa·s; alternatively more than 12500 mPa·s; or less than 14500 mPa·s. The melt viscosity (Brookfield viscosity) of the resin is measured with a Brookfield RTV viscometer using a spindle rotation speed of 3 rpm and at a temperature of 150° C.

In an embodiment, the rosin ester resin has a refractive index of greater than 1.5, and a Brookfield viscosity (ASTM D-3236) of 50 to 25,000 mPa·s at 177° C. measured at 3 rpm as per ASTM D 3236.

Blends of more than one rosin ester resins may be used, in an amount, based on 100 parts of the rubber component, of 5 to 100 phr; or 10 to 80 phr; or from 15 to 50 phr, or any of 5, 10, 15, 20, 25, 30, 35, 40, 45, 50, 55, 60, 65, 70, 75 phr, or in any range between of foregoing numbers.

Fillers: The rubber composition further includes 30 to 200 phr, or 50 to 200 phr of a filler. Examples include, but are not limited to, calcium carbonate, carbon nanotube, clay, mica, silica, silicates, talc, titanium dioxide, alumina, zinc oxide, starch, wood flour, carbon black, or mixtures thereof. The fillers may be of any size, e.g., from 0.0001 μm-100 μm.

Other fillers that can be used include, but are not limited to, particulate fillers including ultra-high molecular weight polyethylene (UHMWPE), particulate polymer gels, and plasticized starch composite fillers known in the art.

In embodiments, the fillers can be surface-treated, e.g., coated or blended with a resin, or coated or reacted with terpene derived silanes.

In embodiments, the composition includes a carbon black filler in an amount from 5 to 70 phr, or 20 to 60 phr, or 30 to 50 phr, or 40 to 60 phr.

Optional Plasticizer Component: "Plasticizer" (also referred to as a processing oil), refers to a petroleum derived processing oil and synthetic plasticizer to extend elastomers and improve the processability of polymer compositions. Suitable plasticizers include, but are not limited to, aliphatic acid esters, hydrocarbon processing oils, tall oil pitch, modified tall oil pitch, and combinations thereof.

In embodiments, the plasticizer is a modified tall oil pitch selected from the group consisting of a pitch ester, a decarboxylated tall oil pitch, a soap of tall oil pitch, a thermally treated tall oil pitch, a thermally or a catalytically treated tall oil pitch, and combinations of the foregoing.

In some embodiments, the plasticizer includes both the extending oil present in the elastomer, and the process oil added during compounding. Suitable process oils include aromatic, paraffinic, naphthenic, and low PCA oils, such as MES, TDAE, and heavy naphthenic oils, and vegetable oils such as sunflower, soybean, canola oil, and safflower oils. Examples of low PCA oils include those having a polycyclic aromatic content of less than 3 percent by weight If present, the plasticizer is added in amounts of up to 75 phr, or from 5 to 70 phr, 5 to 60, or 5 to 50, or 5 to 40, or 5 to 30, or 5 to 20, or 5 to 15 phr.

Coupling Agents: In embodiments, the rubber composition further comprises coupling agents. "Coupling agent" is meant to refer to any agent capable of facilitating stable chemical and/or physical interaction between two otherwise non-interacting species, e.g., between a filler such as silica and an elastomer. Coupling agents cause a filler such as silica to have a reinforcing effect on the rubber. In embodiments, the coupling agent is a sulfur-based coupling agent, an organic peroxide-based coupling agent, an inorganic coupling agent, a polyamine coupling agent, a resin coupling agent, a sulfur compound-based coupling agent, oxime-nitrosamine-based coupling agent, sulfur, and combinations thereof.

In embodiments, the coupling agent is bifunctional, e.g., organosilanes or polyorgano-siloxanes. Other examples of suitable coupling agents include silane polysulfides. The coupling agent can also be a bifunctional polyorganosiloxane, or a hydroxysilane polysulphide. The coupling agent can also include other silane sulphides, e.g., silanes having at least one thiol (—SH) functional group and/or at least one masked thiol functional group. The coupling agent can also be a combination of more than one coupling agents. In embodiments, the coupling agent is an alkoxysilane or a polysulphurized alkoxysilane.

In embodiments, the coupling agent can be present in an amount from 1 to 20 phr, or 1 to 10 phr, or 3 to 15 phr.

Cross-Linking Agents: The rubber component in the composition may be crosslinked by adding curative agents, e.g., sulfur, metals, metal oxides such as zinc oxide, peroxides, organometallic compounds, radical initiators, fatty acids, and other agents known in the art. Other known methods of curing that may be used include, peroxide cure systems, resin cure systems, and heat or radiation-induced crosslinking of polymers. Accelerators, activators, and retarders may also be used in the curing process.

The cross-linking agent can be used in an amount of 0.3-10 phr, or 0.5-5.0 phr, or at least 0.5 phr.

Other Additives: The rubber composition can be compounded with other components known in the art in amounts of up to 10 phr, e.g., sulfur donors, curing aids, processing additives, pigments, organic carboxylic acids, lubricants, waxes, antidegradants, antioxidants, antiozonants and peptizing agents.

Methods for Forming the Rubber Compositions: The rubber compositions can be formed by methods known in the rubber mixing art. For example, the components are typically mixed in two or two stages, e.g. at least one non-productive stage followed by a productive mix stage. The final curatives, e.g., sulfur-vulcanizing agents are typically mixed in the final stage which is conventionally called the "productive" mix stage in which the mixing typically occurs at a temperature, lower than the mix temperature(s) used in the preceding non-productive mix stage(s).

The rubber composition can be subjected to a thermomechanical mixing step, generally comprising a mechanical working in a mixer or extruder for a time suitable in order to produce a rubber temperature of 140° C.-190° C. The duration of the thermomechanical working varies as a function of the operating conditions, volume and nature of the components. For example, the thermomechanical working may be 1-20 minutes.

Properties: Tire rubber compositions comprising the rosin ester resins with low acid numbers and low hydroxyl numbers, as described above, show significant reduction in rolling resistance and improvement in wet grip performance, with performance comparable to that observed with hydrocarbon resins, e.g., C5 hydrocarbon resin, C9 hydrocarbon resin, and alpha methyl styrene resin.

In embodiments, with respect to reduction in rolling resistance, tire compositions with rosin esters have a tan δ at 60° C. comparable to compositions containing an equal amount of alpha methyl styrene resin, and with respect to wet traction (wet grip properties), the compositions exhibits a tan δ at 0° C. comparable to compositions containing an equal amount of alpha methyl styrene resin.

In embodiments, the tire tread composition has a wet grip resistance to rolling resistance indicator ratio ((tan δ at 0° C.)/tan δ at 60° C.) higher than a tire tread composition containing a comparable amount of a rosin ester having a combined acid number and hydroxyl value of more than 50.

In embodiments, the tire tread composition comprising rosin ester resins with a PAN number of less than 10, has an increase in rolling resistance indicator (Tan δ at 60° C.) of less than 3%, and a decrease in wet grip indicator (Tan δ at 0° C.) of less than 1% after the resin is aged for more than 10 months.

INDUSTRIAL APPLICABILITY

Besides tire applications, the composition can be extruded, compression molded, blow molded, injection molded, or laminated into various shaped articles such as fibers, films, laminates, layers, and industrial parts such as automotive parts, appliance housings, consumer products, packaging, and the like.

In tire applications, the rubber compositions are useful for producing a variety of tires such as truck tires, bus tires, automobile tires, motorcycle tires, off-road tires, aircraft tires, and the like. The rubber compositions can also be fabricated into a component of a tire, e.g., treads, sidewalls, chafer strips, tire gum layers, reinforcing cord coating materials, cushion layers, and the like. The rubber compositions can also be useful in other applications, particularly tire curing bladders, inner tubes, air sleeves, hoses, belts, footwear components, rollers for graphic arts applications, vibration isolation devices, pharmaceutical devices, adhesives, caulks, sealants, glazing compounds, protective coatings, air cushions, pneumatic springs, air bellows, accumulator bags, and various types of bladders for fluid retention and curing processes.

The rubber composition can also be used for producing molded rubber parts, such as automobile suspension bumpers, auto exhaust hangers, and body mounts. In yet other applications, the rubber compositions can also be used in medical applications, such as pharmaceutical stoppers and closures, and coatings for medical devices.

EXAMPLES

The following illustrative examples are intended to be non-limiting. In the examples, the following resins were incorporated into tire tread rubber compositions and tested for their performance. Table 1 shows the properties of the resins, where AN means acid number, and OH means hydroxyl value, both given in mg KOH/g.

TABLE 1

| | Properties of Resins | | | | |
|---|---|---|---|---|---|
| | Description | AN | OH | (AN + OH) mg KOH/g | PAN |
| Resin 1 | alpha methyl styrene resin having a Tsp of 85° C. | 0 | 0 | 0 | 0 |
| Resin A | a rosin ester having a Tsp of 102.5° C. | 5 | 3 | 8 | 5 |
| Resin B | a rosin ester having a Tsp of 90° C. | 5 | 6 | 11 | 21 |
| Resin C | a rosin ester having a Tsp of 25° C. | 21 | 33 | 54 | 12 |
| Resin D | a rosin ester having a Tsp of 100° C. | 11 | 15 | 26 | 7 |
| Resin E | a rosin ester having a Tsp of 102° C. | 39 | 15 | 54 | 29 |
| Resin F | a rosin ester having a Tsp of 97° C. | 7 | 10 | 17 | 4 |
| Resin G | a rosin ester having a Tsp 105° C. | 4 | 22 | 26 | 13 |

The resins were incorporated into rubber formulations as shown in Table 2. The formulations were mixed in a 379 ml Banbury type internal mixer using a 3-stage mixing protocol known in the art.

In Examples 1, B, F, and G, both "fresh" and "aged" resins were used. "Fresh" refers to using resins within one (1) month of production in the sample. "Aged" refers to using resins that have been stored for 10-12 months at room temperature (~23° C.). The performance properties, shown in Table 3, are labeled to reflect whether fresh or aged resins were used. The normalized Tan δ data in Table 3 is normalized against the fresh resin values of Example 1. The PAN is related to how the resins age, e.g., the low PAN helps to prevent the resins from aging/changing so that the aged resin provides similar results to that of the fresh resin.

Determination of tan δ was carried out by DMA in temperature-sweep/mode in double shear mode from −60° C. to +100° C. with a heat rate of 1° C./min at 10 Hz, a dynamic strain of 0.1% (from −60° C. to −5° C.), and a dynamic strain of 3% (from −5° C. to 100° C.) using a Metravib+450N. Properties such as tensile strength, elongation, and modulus were measured following procedures described in ISO 37.

TABLE 2

| | Tire Composition Formulations | | | | | | | |
|---|---|---|---|---|---|---|---|---|
| Component (phr) | Example 1 Resin 1 | Example 2 Resin A | Example 3 Resin B | Example 4 Resin C | Example 5 Resin D | Example 6 Resin E | Example 7 Resin F | Example 9 Resin G |
| SSBR (Buna™ 4526-2) | 48.12 | 48.12 | 48.12 | 48.12 | 48.12 | 48.12 | 48.12 | 48.12 |
| BR (Buna™ CB24) | 30 | 30 | 30 | 30 | 30 | 30 | 30 | 30 |
| SSBR (Sprintan™ SLR 4602) | 35 | 35 | 35 | 35 | 35 | 35 | 35 | 35 |
| Ultrasil™ 7000 GR (SA165) | 80 | 80 | 80 | 80 | 80 | 80 | 80 | 80 |
| Carbon black - N234 | 5 | 5 | 5 | 5 | 5 | 5 | 5 | 5 |
| Silane Si-69™ | 8 | 8 | 8 | 8 | 8 | 8 | 8 | 8 |
| Zinc oxide RS™ | 3 | 3 | 3 | 3 | 3 | 3 | 3 | 3 |
| Stearic acid | 2 | 2 | 2 | 2 | 2 | 2 | 2 | 2 |
| IPPD/antidegradant | 1 | 1 | 1 | 1 | 1 | 1 | 1 | 1 |
| 6PPD/ antidegradant | 2 | 2 | 2 | 2 | 2 | 2 | 2 | 2 |

TABLE 2-continued

Tire Composition Formulations

| Component (phr) | Example 1 Resin 1 | Example 2 Resin A | Example 3 Resin B | Example 4 Resin C | Example 5 Resin D | Example 6 Resin E | Example 7 Resin F | Example 9 Resin G |
|---|---|---|---|---|---|---|---|---|
| TMQ/antioxidant | 0.5 | 0.5 | 0.5 | 0.5 | 0.5 | 0.5 | 0.5 | 0.5 |
| Antilux 654 (wax) | 1 | 1 | 1 | 1 | 1 | 1 | 1 | 1 |
| Resin | 20 | 20 | 20 | 20 | 20 | 20 | 20 | 20 |
| Rhenogran ™ CBS-80 | 1.9 | 1.9 | 1.9 | 1.9 | 1.9 | 1.9 | 1.9 | 1.9 |
| Rhenogran ™ DPG-80 | 2.5 | 2.5 | 2.5 | 2.5 | 2.5 | 2.5 | 2.5 | 2.5 |
| Rhenogran ™ IS 90-65 | 2.3 | 2.3 | 2.3 | 2.3 | 2.3 | 2.3 | 2.3 | 2.3 |
| Total: | 242.3 | 242.3 | 242.3 | 242.3 | 242.3 | 242.3 | 242.3 | 242.3 |

TABLE 3

Performance Properties

| | Example 1 Resin 1 | Example 2 Resin A | Example 3 Resin B | Example 4 Resin C | Example 5 Resin D | Example 6 Resin E | Example 7 Resin F | Example 9 Resin G |
|---|---|---|---|---|---|---|---|---|
| Tan δ at 0° C. (−) (fresh resin) | 0.652 | 0.662 | 0.654 | 0.602 | 0.646 | 0.521 | 0.644 | 0.660 |
| Tan δ at 0° C. (−) (aged resin) | 0.651 | — | 0.629 | — | — | — | 0.651 | 0.640 |
| Normalized Tan δ at 0° C. (−) (fresh resin) | 100 | 101 | 100 | 92 | 98 | 79 | 101 | 101 |
| Normalized Tan δ at 0° C. (−) (aged resin) | 100 | — | 96 | — | — | — | 101 | 97 |
| Tan δ at 60° C. (−) (fresh resin) | 0.168 | 0.176 | 0.168 | 0.181 | 0.184 | 0.290 | 0.170 | 0.187 |
| Tan δ at 60° C. (−) (aged resin) | 0.171 | — | 0.171 | — | — | — | 0.169 | 0.199 |
| Normalized Tan δ at 60° C. (−) (fresh resin) | 100 | 105 | 101 | 109 | 111 | 175 | 104 | 102 |
| Normalized Tan δ at 60° C. (−) (aged resin) | 100 | — | 102 | — | — | — | 99 | 106 |
| Elongation at break % | 472 | 501 | 478 | 491 | 474 | 524 | 480 | 542 |
| Tensile strength MPa | 21 | 21 | 19 | 19 | 19 | 19 | 21 | 21 |
| Modulus MPa 50% | 1.4 | 1.4 | 1.1 | 1.1 | 1.1 | 1.3 | 1.3 | 1.3 |
| Modulus MPa 100% | 2.4 | 2.2 | 1.9 | 2.0 | 1.9 | 2.0 | 2.2 | 2.1 |
| Modulus MPa 300% | 10.7 | 10.0 | 9.4 | 9.6 | 9.8 | 8.8 | 10 | 9.2 |
| Modulus MPa 300%/100% | 4.6 | 4.5 | 5.0 | 4.8 | 5.1 | 4.3 | 4.5 | 4.4 |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A tire tread composition comprising a blend of:
 a rubber component, and based on 100 parts by weight (phr) of the rubber component;
 from 5 to 75 phr of a rosin ester resin having a PAN number of less than 25, an acid number of less than 20, a hydroxyl value of less than 30, a combined acid number and hydroxyl value of less than 50, a softening point (Tsp) of 60° C. to 170° C.; and a weight average molecular weight Mw of 700-1500 Da;
 from 30 to 200 phr of a filler;
 from 0 to 75 phr of a plasticizer; and
 wherein the tire tread composition has an increase in rolling resistance indicator (Tan δ at 60° C.) of less than 3%, and a decrease in wet grip indicator (Tan δ at 0° C.) of less than 1% after the resin is stored for 10-12 months at room temperature.

2. The tire tread composition of claim 1, wherein the combined acid number and hydroxyl value is less than 30.

3. The tire tread composition of claim 1, wherein the rosin ester resin has a PAN number of less than 10.

4. The tire tread composition of claim 1, wherein the rosin ester resin has a softening point (Tsp) of 75° C. to 160° C.

5. The tire tread composition of claim 1, wherein the rosin ester resin has a Tg of 0° C. to 115° C.

6. The tire tread composition of claim 1, wherein the rosin ester resin has a softening point (Tsp) of at least 60° C. and a PAN number of less than 10.

7. The tire tread composition of claim 1, wherein the rosin ester resin has an acid number of less than 20 and a PAN number of less than 10.

8. The tire tread composition of claim 1, wherein the rosin ester resin has a combined acid number and hydroxyl value of less than 30, and a PAN number of less than 10.

9. The tire tread composition of claim 1, wherein the tire tread composition has a wet grip resistance to rolling resistance indicator ratio ((tan δ at 0° C)/tan δ at 60° C.) higher than a tire tread composition containing a comparable amount of a rosin ester having a combined acid number and hydroxyl value of more than 50.

10. The tire tread composition of claim 1, further comprising a coupling agent selected from the group consisting of a sulfur-based coupling agent, an organic peroxide-based coupling agent, an inorganic coupling agent, a polyamine coupling agent, a resin coupling agent, a sulfur compound-based coupling agent, oxime-nitrosamine-based coupling agent, and sulfur.

11. The tire tread composition of claim 1, wherein the rubber component is selected from the group consisting of natural rubber (NR), styrene-butadiene rubber (SBR), butadiene rubber (BR), synthetic polyisoprene rubber, epoxylated natural rubber, polybutadiene rubber, nitrile- hydrogenated butadiene rubber NHBR, hydrogenated styrene-butadiene rubber HSBR, ethylene propylene diene monomer rubber, ethylene propylene rubber, maleic acid-modified ethylene propylene rubber, butyl rubber, isobutylene-aromatic vinyl or diene monomer copolymers, brominated-NR, chlorinated-NR, brominated isobutylene p-methylstyrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, polyamide elastomers, and combinations thereof.

12. The tire tread composition of claim 1, wherein the rubber component is styrene-butadiene rubber (SBR) or butadiene rubber (BR).

13. The tire tread composition of claim 1, wherein the rubber is coupled, star-branched, or functionalized with at least a sulfur compound, a silanol group, a silane group, or an epoxy group.

14. The tire tread composition of claim 1, wherein the plasticizer is selected from aliphatic acid esters, hydrocarbon processing oils, tall oil pitch and modified tall oil pitch, and combinations thereof.

15. The tire tread composition of claim 1, wherein the filler is selected from calcium carbonate, carbon nanotube, clay, mica, silica, silicates, talc, titanium dioxide, alumina, zinc oxide, starch, wood flour, carbon black, ultra-high molecular weight polyethylene (UHMWPE), particulate polymer gels, plasticized starch composites, and mixtures thereof.

16. The tire tread composition of claim 1, wherein the filler is surface treated prior to being added to the rubber composition.

17. A method for preparing a tire tread composition comprising:
 providing 0-100 parts by weight (phr) of a rubber component,
 providing from 5 to 75 phr of a rosin ester resin having a PAN number of less than 25, an acid number of less than 20, a hydroxyl value of less than 30, a combined acid number and hydroxyl value of less than 50, a softening point (Tsp) of 60° C. to 170° C.; and a weight average molecular weight Mw of 700-1500 Da;
 providing from 50 to 200 phr of a filler, and optionally up to 75 phr of a plasticizer;
 mixing the rubber component, the rosin ester resin, the filler, and the optional plasticizer to form a mixture;
 kneading the mixture;
 incorporating a cross-linking system into the kneaded mixture to form the tire tread composition; and
 wherein the tire tread composition has an increase in rolling resistance indicator (Tan δ at 60° C.) of less than 3%, and a decrease in wet grip indicator (Tan δ at 0° C.) of less than 1% after the resin is stored for 10-12 months at room temperature.

18. The method of claim 17, wherein the filler is selected from calcium carbonate, carbon nanotube, clay, mica, silica, silicates, talc, titanium dioxide, alumina, zinc oxide, starch, wood flour, carbon black, ultra-high molecular weight polyethylene (UHMWPE), particulate polymer gels, plasticized starch composites, and mixtures thereof.

19. The method of claim 17, wherein the cross-linking system comprises a coupling agent selected from the group of a sulfur-based coupling agent, an organic peroxide-based coupling agent, an inorganic coupling agent, a polyamine coupling agent, a resin coupling agent, a sulfur compound-based coupling agent, oxime-nitrosamine-based coupling agent, sulfur, and combinations thereof.

\* \* \* \* \*